United States Patent [19]

Snider

[11] Patent Number: 4,565,705

[45] Date of Patent: Jan. 21, 1986

[54] PRODUCTION OF JERUSALEM ARTICHOKE FLOUR

[75] Inventor: H. Keith Snider, Hamilton, Mo.

[73] Assignee: Show-Me Low Calorie Foods, Inc., Hamilton, Mo.

[21] Appl. No.: 711,009

[22] Filed: Mar. 12, 1985

[51] Int. Cl.$^4$ ............................................. A23L 1/214
[52] U.S. Cl. ................................... 426/270; 426/468; 426/640
[58] Field of Search .............. 426/615, 622, 270, 640, 426/637, 468, 464, 456, 443, 804

[56] References Cited

U.S. PATENT DOCUMENTS 3,433,668  3/1969  Hein ..................................... 127/67
3,497,360  2/1970  Schaefer et al. .................... 426/549

OTHER PUBLICATIONS

Ward, 1923, The Encyclopedia of Food, New York, p. 271.
Blumenthal, 1947, Food Products Chemical Publishing Co., Inc., New York, p. 635.
Morrison, 1957, Feeds and Feeding, Morrison Publishing Co., New York, p. 394.
Bruttini, 1923, Uses of Waste Materials, King & Son Ltd., England, p. 73.

*Primary Examiner*—Robert Yoncoskie
*Assistant Examiner*—Carolyn Paden
*Attorney, Agent, or Firm*—Arvid V. Zuber

[57] ABSTRACT

This invention is for a process for production of flour from Jerusalem artichoke tubers. The tubers are reduced to particles having an average surface to volume ratio of not less than about 25 cm$^2$ to 1 cm$^3$ and the particles are exposed to water acidified to a pH of not greater than about 4. Thereafter the particles are subjected to a series of pressings at increasing pressures ending in a final pressing at a pressure of not less than about 6 atmospheres, gauge wherein between each pressing the pressure is relaxed and the particles loosened. The particles are washed with water at least once after exposure to the acidified water and prior to the final pressing. After the final pressing the particles are dried at a temperature not exceeding about 200° F. to a moisture content not greater than about 13%. The dried particles are then ground to a flour.

12 Claims, No Drawings

PRODUCTION OF JERUSALEM ARTICHOKE FLOUR

BACKGROUND OF THE INVENTION

This invention relates to production of flour from tubers of the Jerusalem artichoke. Flour derived from Jerusalem artichoke tubers is a nutritionally valuable food since the flour can contain as few as seventy percent or less calories than are found in an equivalent of weight of wheat flour, is high in fiber content and contains significant amounts of minerals, niacin, riboflavin, and ascorbic acid. Prior attempts at producing such flour have encountered difficulties in the grinding step and have produced an unduly darkened flour which has had high levels of the characteristic Jerusalem artichoke flavor.

For example, Mr. Tom Lukens at page 9 of "The Artichoke Connection", Vol. 2, No. 1, Winter, 1984 states: "They found (as did everybody I talked to on flour), and this is something to think about, that if you're going to make flour, you better make sure that you have the stuff bone dry before you run it through the mill because it caramelizes and the hardest rocks of sugary sticky stuff that you can't beat up into a powder unless it is really dry. Of course the cost of drying that last 10%-15% moisture are pretty great. So you can't skimp on drying. If you don't have the percentage moisture down there, you're not going to be able to grind the stuff for flour very well." Surprisingly, the present method permits ready grinding of particles of Jerusalem artichoke tuber which contain much higher amounts of water and permits production of a flour which, after grinding, can still contain 13% moisture without producing any caramelized lumps in the process. Moreover the process requires no browning inhibitor such as sulfur dioxide or ascorbic acid to produce a light colored flour. The sensory quality of the flour is excellent; it has an appearance comparable to whole wheat flour, is free-flowing, has little or none of the characteristic Jerusalem artichoke aroma and essentially no detectable Jerusalem artichoke taste after baking.

It is, therefore, an object of this invention to provide a process whereby a flour can be produced from Jerusalem artichoke tubers without the necessity for excessive drying and which avoids problems, heretofore encountered in grinding.

It is further object of this invention to produce a low calorie product which has a high content of dietary fiber.

DESCRIPTION OF THE INVENTION

The present invention is for a process for production of flour from Jerusalem artichoke tubers which comprises: reducing the tubers to particles having an average surface to volume ratio of not less than about 25 $cm^2$ to 1 $cm^3$ and exposing said particles to a solution comprised of water acidified to a pH not greater than about 4; subjecting the particles to a series of pressings at increasing pressures ending in a final pressing at a pressure of not less than about 6 atmospheres, gauge, wherein, between each pressing the pressure is relaxed and the particles are loosened; washing the particles with water at least once after exposure to the acidified water and before the final pressing; drying the particles at a temperature not greater than about 200° F. to a moisture content not greater than about 13% by weight of the flour; and grinding the dried particles to a flour.

The tubers may be reduced in size to the required surface to volume ratio by shredding, grinding, grating, chopping or any other method which yields a particle, shred or other shape with an average surface to volume ratio not less than about 25 $cm^2$ to 1 $cm^3$. It will be understood that these surface to volume ratios are necessarily the average surface to volume ratios since any of the methods used to reduce the size of the tubers will yield a range of particles sizes a few of which may have a significantly smaller surface to volume ratio than 25 $cm^2$ to $1cm^3$ with many much smaller particles controlling the average surface to volume ratio. It should be noted that the particle surfaces may be highly irregular, as when grinding has been utilized to produce the particles, thus leading to a high surface area. It may also be noted that the freshly ground particles appear to be much larger than they are since the juice-laden particles tend to aglomerate and clump together. However, on modest drying the particles readily separate and it is seen that the average particle size is much smaller than the agglomerated clumps would lead one to believe on casual examination. The surface to volume ratio is an important factor for two reasons. The small particles facilitate maximum contact with the acidified water, as hereinafter described, and permit maximum extraction of the juice of the tubers when compressed. Methods which avoid or minimize contact of the tubers and/or particles obtained therefrom with corridible surfaces, particularly corrodible metallic surfaces are preferred. The process is preferably carried out in corrosion resistant equipment such as stainless steel or plastic or glass lined equipment.

To inhibit color formation the particles are exposed to a solution comprised of water acidified to a pH not greater than about 4, and preferably to a pH of about 3. Although solutions comprised of water acidified to a pH below 3 are not excluded from the practice of the invention, lower PH's are not required to obtain the described product. Traditional browning inhibitors such as sulfur dioxide, ascorbic or erythorbic acid are not required. In order to provide immediate contact with the freshly cut or torn surfaces of the particles it is preferred that the acidified water be added along with the tubers to the grinder, shredder, or other device by which means the tubers are reduced in size in the presence of the acidified water and are discharged from the grinder, shredder or other device along with the acidified water. Although this is a preferred method, satisfactory results can be obtained by rinsing the particles with the acidified water immediately after they have been reduced to the requisite size. It should be noted that the pH of the juice is about 5 and it is necessary that the acidified water have a lesser pH to avoid darkening of the particles.

The solution comprised of acidified water may be acidified with any inorganic or organic acid, salts thereof or combinations of acids and salts capable of acidifying water to a pH of about 3 or less. Sulfuric acid, hydrochloric acid and phosphoric acid are satisfactory inorganic acids. Acetic and citric acids exemplify organic acids which may be used as acidfying agents, and, as is well known, there is a variety of combinations of salts with and without acids (buffers) which may be used to acidify water to the desired pH.

The particles are pressed at progressively higher pressures to expel juice from the particles. This is done in a series of steps with the pressure being released and the particles being loosened or separated from the compressed mass between each pressing. This loosening or separation minimizes pockets of uneven pressure and juice and tends to maximize removal of juice from the particles. The final pressing is at a pressure of at least 6 atmospheres, gauge. The particles after being exposed to the acidified water are washed with water at least once prior to the final pressing. It is preferred that the particles be washed between one or more of the pressing steps after the pressure has been released and the particles have been loosened or separated; in such case the particles may be washed in the press.

In a preferred embodiment of my invention the particles along with the acidified rinse water are placed into the press and subjected to a first pressing at a pressure of between 1½ atmospheres, gauge, to 2½ atmospheres, gauge, the pressure is then released and the particles loosened, the particles are then pressed a second time at a pressure between 2½ to 4½ atmospheres, gauge, followed by releasing the pressure and loosening the particles. The particles are then pressed a third time at a pressure of not less than about 6 atmospheres, gauge. The particles may be washed after either or both of the first or second pressings. It is to be understood that for purposes of this invention the steps of "loosening" or "separating" are intended to include loosening or separating done concurrently with or by means of the water wash. The water wash is an important aspect of the invention since I have found that this step produces a lighter colored product, reduces the characteristic flavor and odor of Jerusalem artichoke in the final product, promotes ease of grinding, reduces the carbohydrates in the flour by at least 25%, and, since the principal carbohydrate in Jerusalem artichokes is inulin, which may be regarded as having no available dietary calories, the actual reduction in available calories may be much greater than 25%.

After the final press, the particles are dried by conventional means such as a forced air, or rotary, or fluid bed or belt drier, cyclone, conventional or microwave oven. The particles, as they come from the press tend to aglomerate, and, for reasons not fully understood, the lumps or agglomerates have a tendency to darken during drying. Therefore, for optimum quality of the flour it is preferred that any lumps, large particles and agglomerates be removed prior to drying.

It has been observed that the undried particles tend to darken upon standing and a lighter colored final product is obtained when the particles are moved from the final press to the drier without undue delay. It is preferred that the particles be removed from the final press directly to the drier.

The particles are dried at an elevated temperature. To avoid excessive darkening of the particles the temperature should not exceed about 200° F. The particles are dried to a moisture content of not greater than about 13% by weight based on the weight of the flour, preferably to a moisture content of not greater than about 10% by weight based on the weight of the flour.

Using the above-described process I have produced a flour, light in color and having little or none of the characteristic Jerusalem artichoke aroma which, typically, has the composition: per 100 grams of flour given in the following table:

| Composition of Jerusalem Artichoke Flour | |
|---|---|
| Total Carbohydrates | 68.9 g |
| "Digestible"[1] Carbohydrates | 46.4 g |
| Dietary Fiber[2] | 22.5 g |
| Protein | 13.5 g |
| Fat | 1.1 g |
| Ash | 5.6 g |
| Moisture | 10.9 g |
| | 100 g |
| Total calories | 249.5/100 g |

[1]"Digestible" carbohydrates are obtained by subtracting dietary fiber from total carbohydrates. Since the residue contains a substantial portion of inulin, a carbohydrate of doubtful caloric availability the actual digestible carbohydrates may be considerably lower than 46.4 g./100 g. of flour.
[2]Dietary fiber includes substances such as lignin, cellulose and hemicellulose; some definitions include soluble substances such as pectins, gums and mucilages.
[3]Since the major portion of the caloric value is contributed by the "Digestible" carbohydrates, any significant portion of inulin in these carbohydrates may result in an appreciably lower caloric value than calories/100 g. of flour listed above.

It is to be understood that the foregoing description of the specific embodiments of the invention are illustrative only and are not intended to limit the scope of the invention and the ambit of the claims inasmuch as additional embodiments will be readily apparent to those skilled in the art.

What is claimed is:

1. The process for the production of a flour from Jerusalem artichoke tubers which comprises:
    reducing said tubers to particles having an average surface to volume ratio of not less than about 25 cm$^2$ to 1 cm$^3$ and exposing said particles to a solution comprised of water acidfied to a pH not greater than about 4 for a period of time sufficient to inhibit color formation;
    pressing said particles at a final pressure of not less than about 6 atmospheres, gauge by subjecting the particles to a series of pressings at increasing pressures to remove juice from the particles, while releasing the pressure and loosening the compressed particles between each pressing;
    washing the particles at least once with water prior to the final pressing and after exposure to the acidified water;
    drying the particles at a temperature not greater than about 200° F. to a moisture content not greater than about 13%; and grinding the dried particles to a flour.

2. The process of claim 1 wherein the particles are washed with water after each pressing.

3. The process of claim 1 wherein the particles are subjected to a first pressing at a pressure in the range from about 1½ atmospheres, gauge to 2½ atmospheres, gauge, a second pressing at a pressure in the range from about 3½ atmospheres, gauge, to 4½ atmospheres, gauge and said final pressing at a pressure not less than about 6 atmospheres, gauge.

4. The process of claim 1 wherein the particles are subjected to a first pressing at a pressure in the range from about 1½ atmospheres, gauge, to 2½ atmospheres, gauge, a second pressing at a pressure in the range from about 3½ atmospheres, gauge, to 4½ atmospheres, gauge and a final pressing at a pressure not less than about 6 atmospheres, gauge, and the particles are washed with water after the first and second pressings.

5. The process of claim 1 wherein:
    said particles are subjected to a first pressing at a pressure in the range from about 1½ atmospheres, gauge to 2½ atmospheres, gauge, followed by releasing the pressure, loosening the particles and washing the particles with water, a second pressing at a pressure in the range from about 1½ atmospheres, gauge, to 2½ atmospheres, gauge, followed by releasing the pressure, loosening the particles and washing the particles with water, and a final pressing at a pressure not less than about 6 atmospheres, gauge;

removing particle lumps and agglomerated particles from the particles after the final pressing and promptly drying said particles and wherein the process is carried out in corrosion resistant equipment.

6. The process of claims 1, 2, 3, 4 or 5 wherein the tubers are reduced to particles in the presence of the acidified solution.

7. A process of claim 1, 2, 3, 4 or 5 wherein the solution comprised of acidified water is acidified to a pH of about 3.

8. The process of claim 1, 2, 3, 4 or 5 wherein the tubers are reduced to particles in the presence of a solution comprised of water acidified to a pH of about 3.

9. The process for the production of a flour from Jerusalem artichoke tubers which comprises:

reducing said tubers to particles having an average surface to volume ratio of not less than about 25 $cm^2$ to 1 $cm^3$ in the presence of a solution comprised of water acidified to a pH of about 3 with an acid selected from the group consisting of hydrochloric acid, sulfuric acid, phosphoric acid, acetic acid and citric acid for a period of time sufficient to inhibit color formation;

subjecting the particles to a first pressing at a pressure in the range from about 1½ atmospheres, gauge, to 2½ atmospheres, gauge, followed by loosening the particles, a second pressing at a pressure from about 3½ atmospheres, gauge, to 4½ atmospheres, gauge, followed by releasing the pressure and loosening the particles and a final pressing at a pressure not less than about 6 atmospheres, gauge to remove juice from the particles;

washing said particles with water at least once prior to the final pressing and after exposure to the acidified water;

removing agglomerated particles and particle lumps from the pressed particles;

promptly drying said particles at a temperature not greater than 200° F. to a moisture content of not greater than 13% by weight of the particles;

grinding the particles to a flour; and wherein the process is carried out in corrosion resistant equipment.

10. The process of claim 9 wherein the solution comprised of acidified water is acidified with hydrochloric acid.

11. The process of claim 9 wherein the solution comprised of acidified water is acidified with citric acid.

12. The process of claim 9, 10, or 11 wherein the tubers are reduced to particles having an average surface to volume ratio of not less than about 50 $cm^2$ to 1 $cm^3$.

* * * * *